Jan. 31, 1967  H. W. BOTELER  3,300,844
METHOD OF MAKING VALVE BODIES
Filed May 6, 1963  9 Sheets-Sheet 1

INVENTOR.
HENRY W. BOTELER
BY David E. McKenney
ATTORNEY

INVENTOR.
HENRY W. BOTELER

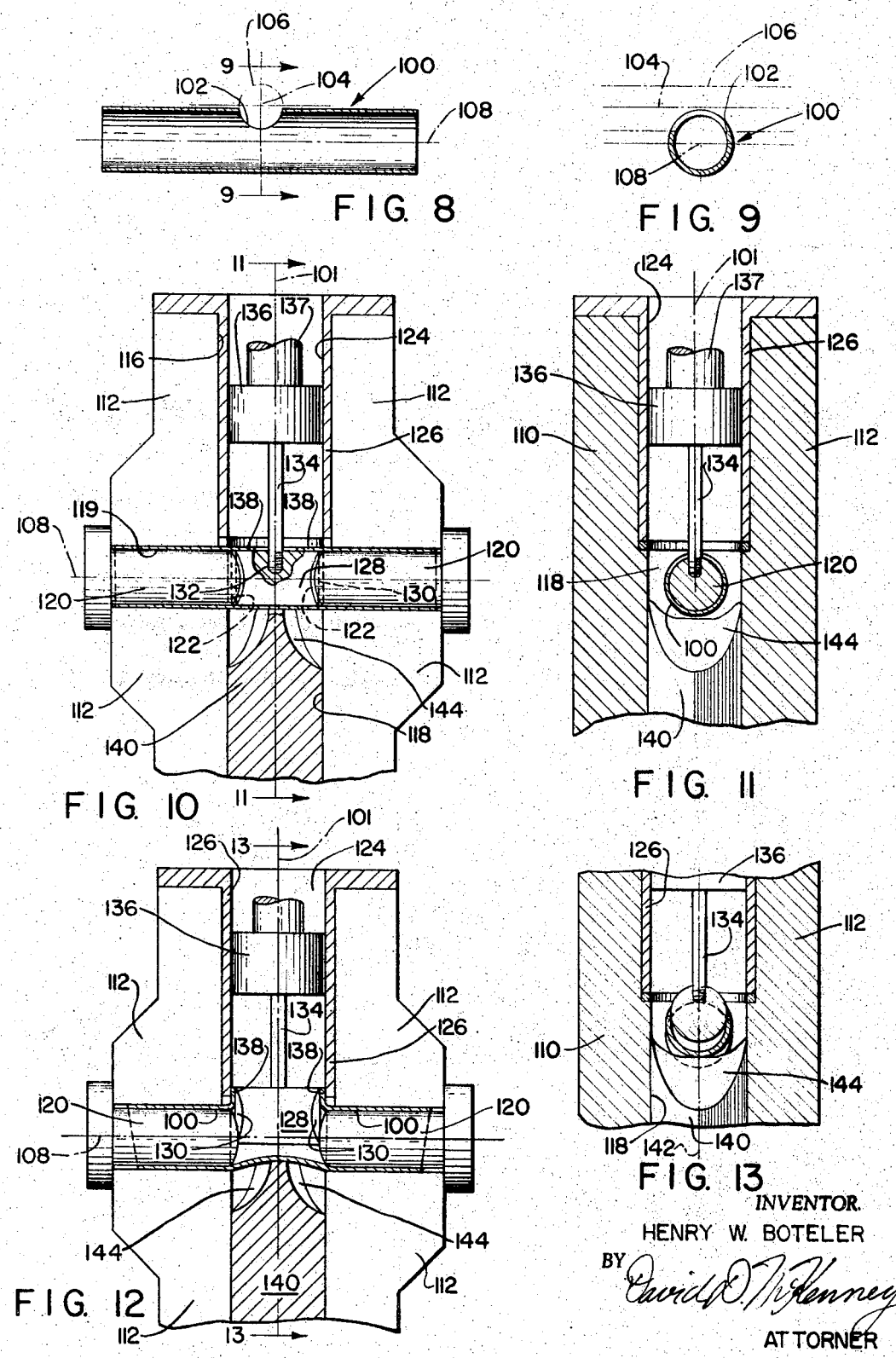

INVENTOR.
HENRY W. BOTELER

Jan. 31, 1967   H. W. BOTELER   3,300,844
METHOD OF MAKING VALVE BODIES
Filed May 6, 1963   9 Sheets-Sheet 6

INVENTOR.
HENRY W. BOTELER
BY David D. McKenney
ATTORNEY

Jan. 31, 1967  H. W. BOTELER  3,300,844
METHOD OF MAKING VALVE BODIES

Filed May 6, 1963  9 Sheets-Sheet 7

INVENTOR.
HENRY W. BOTELER
BY
ATTORNEY

United States Patent Office 3,300,844
Patented Jan. 31, 1967

3,300,844
METHOD OF MAKING VALVE BODIES
Henry W. Boteler, East Greenwich, R.I., assignor to Grinnell Corporation, Providence, R.I., a corporation of Delaware
Filed May 6, 1963, Ser. No. 278,027
3 Claims. (Cl. 29—157.1)

This invention relates to improvements in methods of making valve bodies and further relates to improvements in means for practicing said methods. More particularly, it has to do with a method of forming from a single piece of pipe or tubing a valve body which is complete except for special end connections. It further has to do with novel tools and dies which can be used to practice said method.

One type of valve which is widely used in industry today is the type in which closure is achieved by moving a relatively soft closure member into the body through an opening in one side thereof and by seating this closure member against parts of the body walls which lie in an irregular curved seating plane. An example of this type is the high-weir diaphragm valve in which the valve body has a flow passageway therethrough with an opening on one side and also has a weir rising across the passageway from the opposite side. The top of the weir provides a seating surface for the center of a diaphragm which has its periphery clamped to the body around the opening. Because the diaphragm material is relatively soft, it seats satisfactorily against the weir surface even though the latter is irregularly shaped and is not carefully machined. In conventional globe and gate valves the seating surfaces are regularly shaped in the sense that they lie either in flat planes or in planes which form constant angles with the direction of movement of the valve actuator. In addition, the seating surfaces in such valves are usually carefully machined.

Diaphragm valves of this high weir type are the ones most widely used, but there are other types having much lower weirs or no weirs at all. In the case of a low weir the seating is as described above except that the weir surface is more abruptly curved from one side of the body opening to the other. In the case where there is no weir the seating is directly on the walls of the body which slope from the sides of the opening to a smooth juncture with the walls of the passageway and thereby provide an even more abrupt curve.

In all these diaphragm valves a common feature is the clamping of the diaphragm periphery to a flange around the body opening. This isolates the fluid in the flow passageway from the actuating mechanism which moves the center portion of the diaphragm to and from the seating. In the high weir valves this center portion has only a shallow bulge which is flexed into and out of engagement with the concave seat. In the case of the low-weir or no-weir valves this center portion is proportionately more severely bulged. The actuating mechanism which provides the flexing is housed in a bonnet which also serves to clamp the diaphragm periphery against the rim of the body opening.

In those applications where isolation of the fluid from the interior of the bonnet is not necessary, as for example, where the fluid is not corrosive or does not have to be kept completely free of contamination, the bonnet can be sealed to a flange around the opening by a separate gasket, and a closure member can be employed which seats on an irregularly shaped seating surface similar to that of the diaphragm valves except that it extends around the passageway. Such a valve is essentially a gate valve but of a special type in that the closure member strongly resembles the center portion of a diaphragm, and the seat engaged by the closure member is of the diaphragm type.

The bodies in such diaphragm and special gate valves have usually been formed from cast metal. However, there have been many attempts to fabricate these bodes by separately forming pieces of metal pipe, tubing, plate and sheet and then joining these pieces together by welding or the like. The objective of these attempts has been to avoid certain disadvantages inherent in casting, but the joining of separate pieces has itself created problems. In these attempts at fabrication joining has been especially necessary in the case of the flange around the closure member opening, because in the previous designs this flange has always been so wide and thick relative to the other parts that it had to be formed from a separate piece and secured to the other piece or pieces forming the flow passageway and seating.

Such a wide and thick flange could not be formed by merely distorting the material of the passageway piece outward from the closure member opening, because this distortion is a particularly difficult operation when the starting form of the passageway piece is a single section of pipe or tubing (as is preferred), and because this piece has already been appreciably distorted to obtain the shape of the closure member opening. The additional distortion required for the achievement of a conventionally large and thick outwardly extending flange has always been regarded as too severe to be successful.

The present invention overcomes these previous difficulties and is an improved method for forming a valve body from one piece by forming an integral flange from the material of the same section of pipe or tubing which is used to obtain the shape of the passageway and closure member seating.

Another reason for past difficulties in forming valve bodies from pipe or tubing has been the heavy reliance on the rigidity of the pipe or tubing material to help achieve the final shape. For example, external dies have been used, but no internal dies, the expectation being that the rigidity of the piece would cause it to remain against the external dies contours during forming. While this technique has met with some success, the amount of rigidity has not been sufficiently constant from one piece of pipe or tubing to the next to duplicate results to the desired extent. In the most widely used diaphragm valve body type having a high weir there has been particular reason for placing this reliance on material rigidity because of the difficulty of employing internal dies in such a body to enclose all sides of the material between the die surfaces. For example, conventional weir-type diaphragm valve bodies have always had internal regions into which dies cannot be moved along the passageway axis or along the closure member opening axis. Introduction of the internal dies along one of these axes is the only practical way in production because it can be done automatically or with relatively simple tools and fixtures. In the existing designs even after dies are inserted along these axes the internal regions referred to have become pockets into which pipe material could be erroneously collapsed during forming, and it is for this reason that reliance has hitherto been placed on so configuring the dies that the rigidity of the material would cause it to go into the proper place.

The present invention overcomes these difficulties by providing a novel method of forming valve bodies from pipe or tubing, one of the features being the complete filling of the internal regions of the valve body with die parts by axial insertion of these parts into the valve body. As a consequence of this feature little or no reliance is placed on material rigidity to achieve the desired final shape.

Another feature of the method is the employment of a force pushing outwardly on the edge of the closure member opening to initially flare the opening flange.

Another feature of the method is the filling of the closure member opening with a solid core portion followed by exerting force along the surface of the core portion to wedge the flared opening flange radially outward from the core portion.

Another feature is the pressing of the body material into the final seating shape by the same force which fills the closure member opening with the core portion.

The present invention also contemplates the provision of dies which can be used to practice the novel method and which are themselves believed to be novel.

One feature of these dies is the provision of a passage into which a first internal die portion is initially moved from the interior of the pipe section to outwardly flare the closure member opening flange, along which a second internal die portion is movable to fill the closure member opening and along which a wedging die portion is movable around the second die portion to outwardly wedge the flared flange.

Another feature is the provision of another passage which is opposite to the passage first mentioned and in which a weir-forming plunger is guided.

Another feature is the provision of the last-mentioned passage in such cross-sectional shape that all the exterior surfaces on the formed body which are in the path of the plunger are engaged by the plunger end.

In general practicing the method of the present invention to form a diaphragm valve of the weir type involves cutting in one ide of a straight section of pipe or tubing a hole smaller than the desired closure member opening, inserting into the section from one end thereof, and to a location opposite the hole, a cylindrical member having a length equal to the diameter of the closure member opening, gripping the ends of the section with die parts on the interior and exterior of the section, pressing the exterior side of the section inwardly opposite the hole and simultaneously forcing the cylindrical member out through the hole to enlarge the same and outwardly flare the edges thereof, inserting into this enlarged hole a die core the end of which coins the interior weir surface between the sides of the hole and the sides of which fit nicely between the interior die parts and fill the closure member opening, and finally flaring the edges of the hole outwardly from the core die and downwardly against the interior die parts which grip the section ends.

Accordingly, it is an object of the present invention to provide method and means for forming valve bodies with one or more of the above mentioned features.

Another object is to provide method and means of forming valve bodies which are inexpensive and involve a minimum of tooling.

Other objects will appear hereinafter.

The best modes in which it has been contemplated applying the principles of the present invention are shown in the accompanying drawings but there are to be deemed primarily illustrative for it is intended that the patent cover by suitable expression in the appended claims whatever of patentable novelty exists in the invention disclosed.

In the drawings:

FIGURE 8 is a cross-sectioned side elevation view of a pipe or tubing section at the beginning of the method of the present invention, a preparatory hole having been cut for the closure member opening;

FIGURE 9 is a cross-sectioned end view taken on line 9—9 of FIG. 8;

FIGURE 10 is a cross-sectioned side elevation view of the pipe section of FIG. 8 located in dies preparatory to the initial forming of the weir and enlarging of the hole;

FIGURE 11 is a cross-sectioned end view taken on line 11—11 of FIG. 10;

FIGURE 12 is a cross-sectioned side elevation view of the pipe section beginning to be formed by the dies of FIG. 10;

FIGURE 13 is a cross-sectioned end elevation view taken on line 13—13 of FIG. 12;

FIGURE 14 is a cross-sectioned side elevation view of the pipe section just after completion of the forming by the dies of FIG. 10 and showing the relative positions of these dies at this stage;

Figure 1:
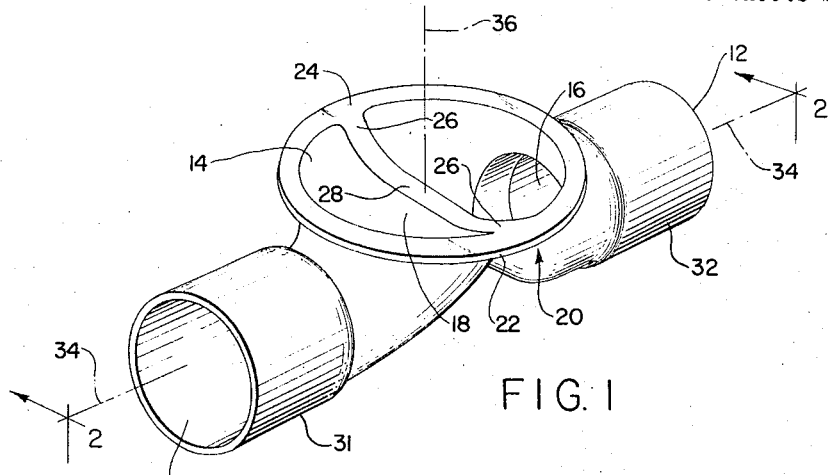
FIGURE 1 is a perspective view of a weir-type diaphragm valve body made by the method of the present invention.

Referring now more particularly to the drawings, FIG. 1 shows a valve body of the weir-type which has been formed in accordance with the method of the present invention from a single section of pipe or tubing and without appreciable machining.

A description of the body itself will provide a better understanding of the method steps. It is essentially a cylinder with two opposite end openings 10 and 12 and a side opening 14 between them. A passageway 16 extends from one end opening to the other over a high weir 18 which extends toward the opening 14 from the side of the body opposite thereto. The opening 14 is surrounded by flange 20 which has a substantially circular edge 22 and a clamping surface 24 in a flat plane 25. Blending with this flange surface 24 on the opposite sides of the body are the ends 26 of the weir surface which has a concave center portion 28 lying across the opening 14 and upwardly presented so as to act as a seat for the diaphragm 30 (see FIG. 6). From the weir 18 the passageway blends smoothly to the cylindrical shape of the valve ends which are the form of sockets 31 and 32.

The particular valve body shown has such a shape that despite the complexity of the transition of the passageway walls from the weir to the end connections it is possible to completely fill the interior of the passageway in this transition area and elsewhere with die components inserted along the axis 34 of the end connections and along the axis 36 of the closure member opening 14. Stated another way, the shape of the finished body is such that every point on the surface of the passageway 16 may be projected uninterruptedly through an end opening 10 or 12 or through the closure member opening 14 along a line parallel to the axis of that opening. In this way the die components which will be described can be inserted quickly and easily by a machine set up for volume production.

Figure 2:
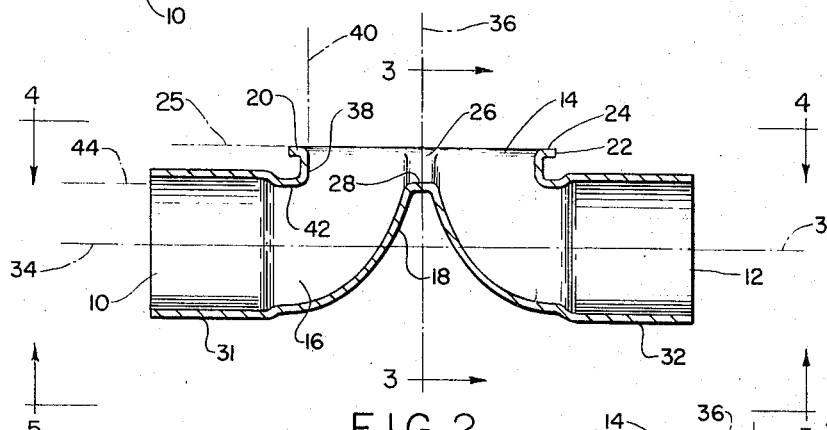
FIGURE 2 is a cross-sectioned side elevation view of the body of FIG. 1.
Figure 3:
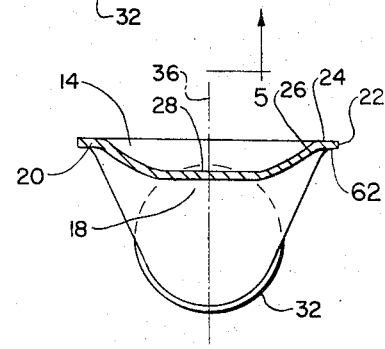
FIGURE 3 is a cross-sectioned end elevation view taken on line 3—3 of FIG. 2.
Figure 4:
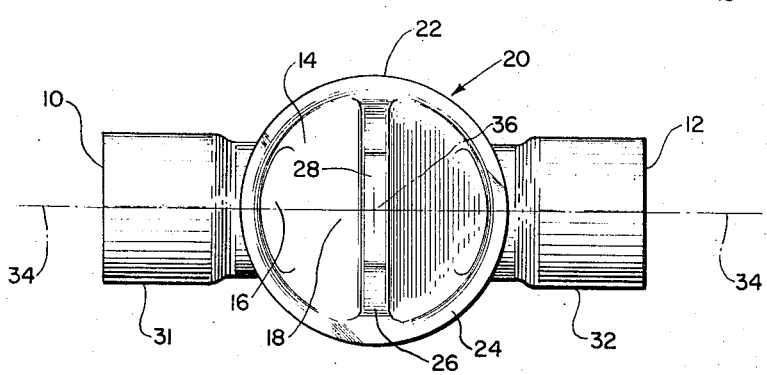
FIGURE 4 is a top plan view taken on line 4—4 of FIG. 2.
Figure 5:
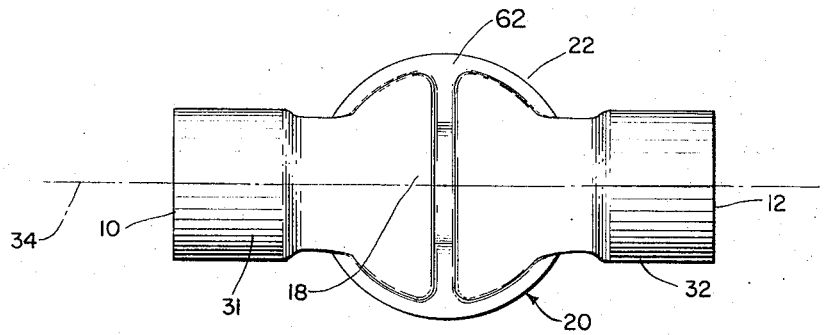
FIGURE 5 is a bottom plan view taken on line 5—5 of FIG. 2.

As an example of the foregoing in the FIG. 2 the point 38 may be projected out of the opening 14 along line 40 parallel to axis 36 although it cannot be projected from an end opening along any line parallel to axis 34. On the other hand, point 42 may be projected out of end opening 10 along line 44, although it cannot be projected from opening 14.

Figure 6:
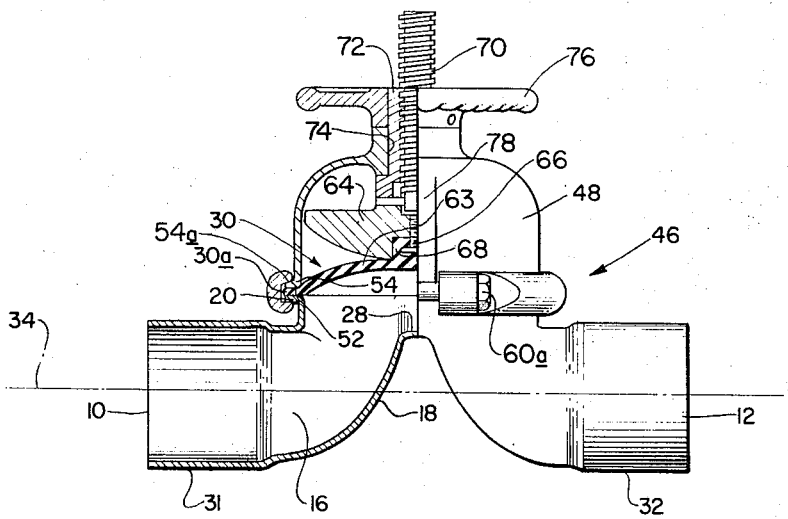
FIGURE 6 is a side elevation view partially sectioned of an assembled diaphragm valve employing the body of FIGS. 1–4.

FIGURE 6 shows how the body of FIGS. 1–4 may be assembled in a valve. Since this body is formed of a piece of pipe or tubing in accordance with the method which will be described there is no opportunity to provide extra thick portions for increasing body rigidity. As a result, where the pipe or tubing is relatively thin-walled, a clamp 46 may be employed to connect the bonnet 48 to the body. More particularly, this clamp squeezes the diaphragm peripheral portion 30a between the surface 52 of a bonnet flange 54 and the body flange surface 24.

Figure 7:
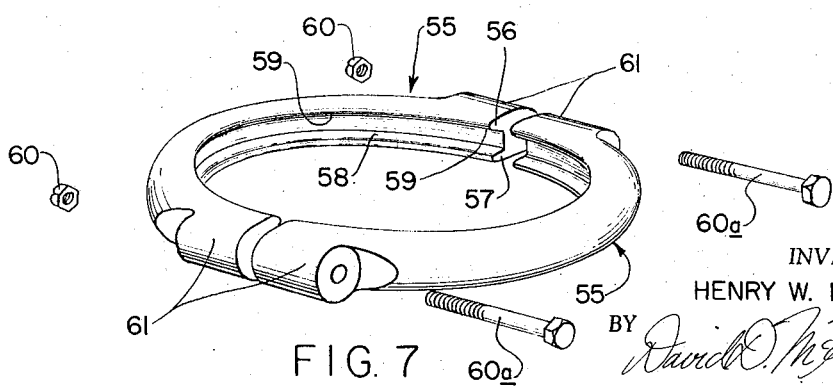
FIGURE 7 is a perspective view of the clamp used in FIG. 6.

The clamp 46 is capable of the aforementioned squeezing action because it is formed in two semi-circular strap-like portions 55 (see FIG. 7) with U-shaped cross-sections with the legs 56 and 57 of the U-shape diverging, and with the inner surfaces 58 and 59 of these legs converging so as to wedge the body and bonnet flanges together when the strap-like portions are drawn together around the flanges. This drawing together is achieved by the bolt and nut assemblies 60. Each bolt 60a passes through a boss section 61 on the end of a strap portion end. The undersurface 62 of the body flange lies in a flat plane parallel to the plane 25 of the surface 24, and, accordingly, the inner surface 58 of the lower leg 57 preferably also lies in a flat plane. To achieve the wedging action the inner surface 59 of the upper leg 56 diverges, and the upper surface 54a of the bonnet flange is shaped correspondingly.

Referring again to FIG. 6 the central diaphragm portion 63 is domed upwardly in its molded condition so that it can be reversed and pressed downwardly against the surface of the wier 18 by a compressor 64 to which the diaphragm is secured by a stud 66 with its shank threaded into the compressor and with its head embedded in a boss 68 on the diaphragm. In turn the compressor 64 is pivotally connected to the lower end of a spindle 70 which is threaded into a bushing 72 rotatably mounted in an opening 74 at the top of the bonnet and provided at its upper end with a handwheel 76 where it emerges from the bonnet. The compressor and spindle are prevented from rotating by small projections (not shown) on the compressor which lie in vertical grooves on the interior surface of the bonnet adjacent the weir ends. The exterior surface of the bonnet has vertical ribs 78 to provide for these grooves. When the handwheel 76 is rotated the spindle and compressor move vertically, for example, upwardly, to pull the diaphragm from the weir and bulge the diaphragm to the open position shown.

FIGS. 8–27 illustrate the body of FIGS. 1–4 at various stages in a preferred manner of practicing the method of the present invention. They also illustrate preferred apparatus according to the present invention.

FIG. 8 shows a piece of two-inch (inside diameter) Schedule 5 carbon steel tubing 100. An opening 102 has been cut in one side of this piece, the shape of the opening being the intersection of the piece by an imaginary cylinder 106 having a one inch radius and having an axis 104 spaced 1½ inches away from the axis 108 of the piece of tubing. In the side elevation view of FIG. 8 this cylindrical opening 102 appears as the arc of a circle. Other shapes for this hole can be employed, the configurations preferred in each case being determined by the relative size of the closure member opening in the finished body and by the width of the flange around the closure member opening. The shape used is arrived at by simple trial and error experimentation. Preferably the initial hole 102 is so formed that it provides an opening flange of uniform width and later trimming of the outer flange edge will be unnecessary. No formula has been discovered for calculating the most suitable initial shape of hole 102. This shape will depend on a number of variables including the thickness of the tubing wall, the height of the weir, the material of which the tubing is made, the temperature at which the forming takes place and the uniformity of the temperature. However, the opening should be generally like that shown and relatively simple experiments will indicate what small changes should be made in this general shape in each case.

In FIGS. 10 and 11, the piece of tubing 100 is shown located between two die halves 110 and 112 which, when put together, define a vertical passage which is cylindrical at its larger upper end 116 and which is rectangular at its smaller lower end 118. The two die halves when put together also define a cylindrical horizontal passage 119 which intersects the vertical passage and which has ends opening through the sides of the die halves. The piece of tubing is heated prior to insertion into the passage 119 as shown in FIGS. 10 and 11, for example, to about 1000° F. The dies may be heated to some suitable lower temperature to prevent the tubing piece from cooling too much after it is inserted and before the forming is completed. During production, however, the dies will become heated by contact with successive pieces, so that special heating equipment is not needed.

In addition to the die parts 110 and 112 which grip the outside of the tubing piece at the ends thereof, plugs 120 are inserted into these ends through the ends of passage 119 and fit against the interior walls of the piece. These plugs 120 have their inner ends 122 concaved as best shown in FIG. 10 to the same curvature as the interior surface 124 of a cylindrical sleeve 126 which is fitted into the cylindrical passage end 116. Between these concave plug ends there is located a separate short cylindrical member 128 which fits against the interior walls of the tubing piece at the center thereof and which has convexed ends 130 matching the concaved ends of the plugs 120. The cylindrical member 128 is positioned opposite the hole 102 in the tubing piece and has a length slightly less than the diameter of the cylindrical sleeve surface 124 by about twice the thickness of the tubing wall. The cylindrical member 128 is provided with a threaded hole 132 adapted to receive the threaded end of a rod 134 having its upper end connected to a guide 136 which is cylindrical and is guided on the cylindrical surface 124 of sleeve 126. This guide 136 is in turn connected to a press part 137 capable of moving the guide 136 and rod 134 upwardly to pull the cylindrical member 128 through the hole 102. FIGS. 12 and 13 show the positions of the above-described parts when the cylindrical member 128 is part-way out of the tubing piece.

The result of this withdrawal is that the portions 138 of the tubing piece which overlie the ends of the cylindrical member 128 in FIG. 10 are distorted upwardly into positions shown in FIGS. 12 and 13, these positions being determined primarily by the convex ends 130 of member 128 and by the walls 124 of the sleeve 126. The function of the guide 136 is to make sure that the upward movement of the cylindrical member 128 is along the axis 101 of the vertical passage in the die and to make sure that the cylindrical member 128 does not tip.

Figure 18:
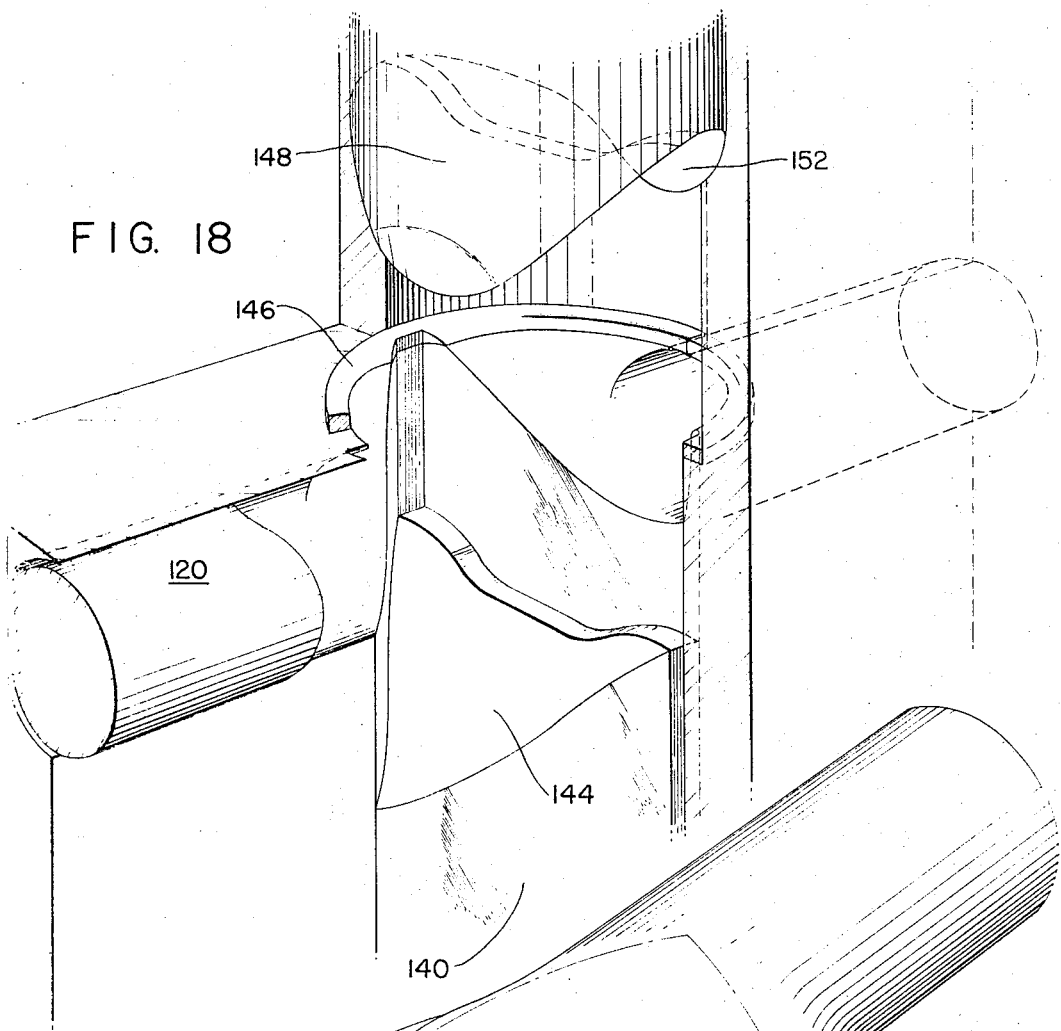
FIGURE 18 is a sectioned perspective view of the dies of FIG. 16 to better show the shape of these tooling components.
Figure 18A:
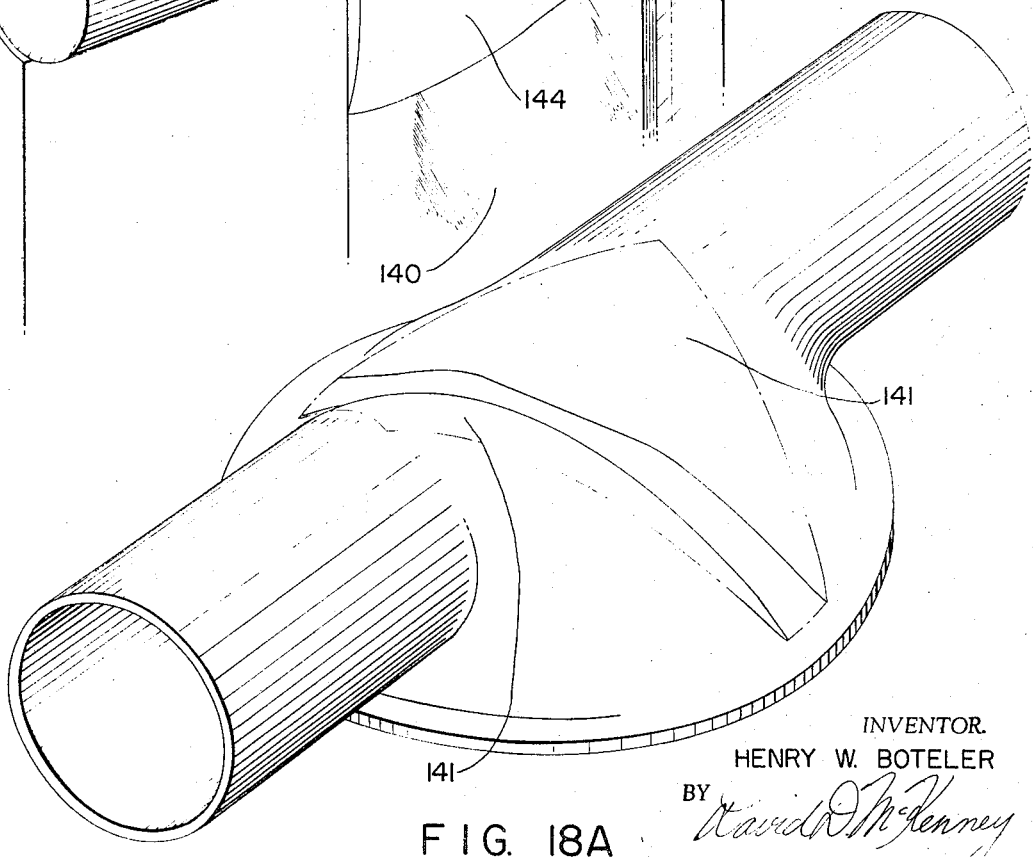
FIGURE 18A is a perspective view of the bottom of a finished body showing the area engaged by one of the die components.

Simultaneously with the withdrawal of the cylindrical member 128 to flare the edge 138 of the opening, the weir is formed by a die component 140 engaging the outside of the tubing section opposite the hole 102. This die component slides in the rectangular lower portion 118 of the vertical passageway and accordingly is itself rectangular in cross-section. Furthermore, two opposite corners of the rectangle are located in a plane 142 containing both the opening axis 101 and the tubing section axis 108. This construction enables the unformed tubing section of FIG. 8 to be inserted freely in the space provided by the stationary die components 110 and 112 and at the same time allows substantially all the non-cylindrical surfaces presented along the axis 101 and away from the underside of the body to be conveniently engaged by the shaped end 144 of die component 140. This is illustrated in FIG. 18A which shows the area 141 on the exterior valve body surface which is engaged by the shaped end 144 of the die component 140. The final shape of the valve body is very well suited to a rectangular die component such as 140, oriented in the manner shown.

Figure 14:
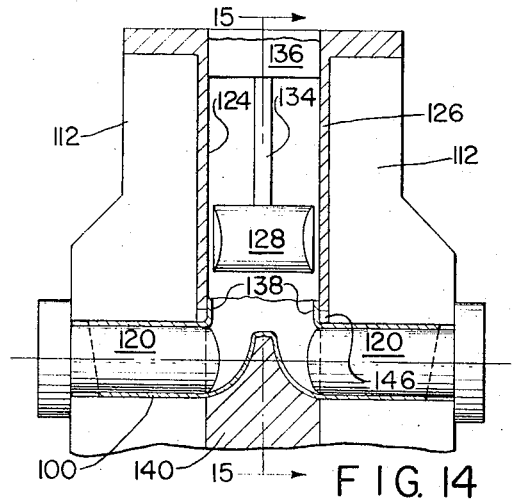
FIGURE 14 is a cross-cseoitsden  tel2
Figure 15:
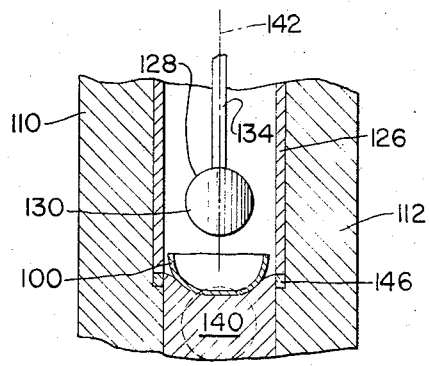
FIGURE 15 is a cross-sectioned end elevation view taken on line 15—15 of FIG. 14.

FIGS. 14 and 15 show the same apparatus as in FIGS. 10, 11, 12, and 13, but at a point farther along in the method when the cylindrical member 128 has been completely pulled out of the tubing piece and the movable die component 140 has been advanced to its final position. The lower end of the cylindrical sleeve 126 is provided with a separate loose ring 146 which is formed in two semi-circular parts with their ends abutting in the plane 142. The purpose of this ring is to provide the spacing between the underside of the body flange 20 and the adjacent exterior wall of the end connections. The ring 146 provides the form against which the flange is flared outwardly, as will appear.

Figure 16:
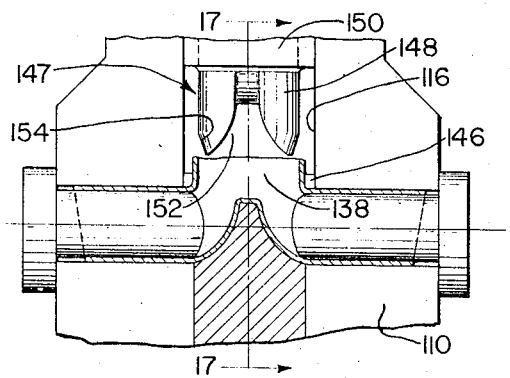
FIGURE 16 is a cross-sectioned side elevation view of the equipment of FIGS. 14 and 15 with a new die core piece ready to insert into the enlarged hole.
Figure 17:
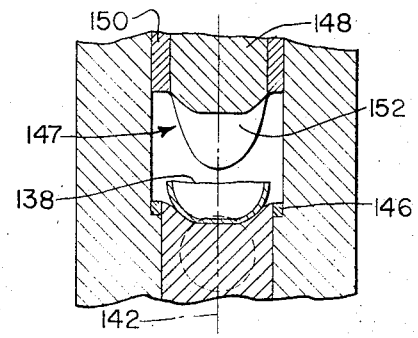
FIGURE 17 is a cross-sectioned end elevation view taken on line 17—17 of FIG. 16.

FIGS. 16 and 17 are like FIGS. 14 and 15 except that the cylindrical member 128, rod 134, guide 136 and sleeves 126 have been removed (but not the ring 146) and a new tool 147 has been inserted in the cylindrical end 116 of the die passage. This new tool has a central cylindrical part 148 sliding vertically in an annular cylindrical sleeve 150 which in turn slides in the cylindrical die passage end 116.

The lower end of the central part 148 is shaped as shown at 152 to engage the weir seating surface, and the diameter of the part 148 equals the diameter of the final closure member opening. To make sure that the part 148 passes into this opening without striking the upstanding edges 138 of the tubing section, a slight taper is provided at locations 154.

Figure 19:
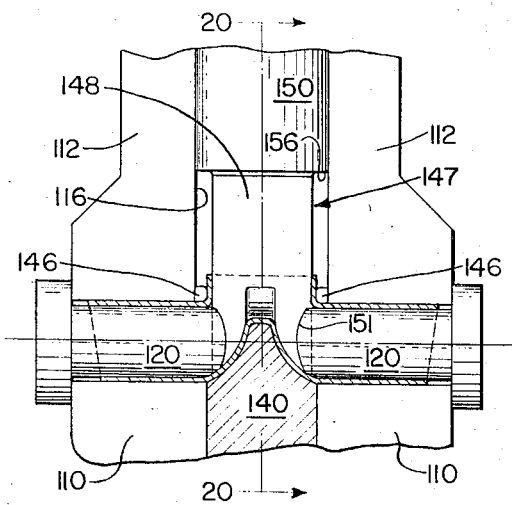
FIGURE 19 is a cross-sectioned side elevation view of the pipe section of FIG. 17 with the die core piece inserted to "coin" the interior weir surface.
Figure 20:
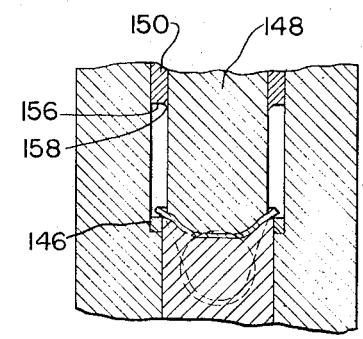
FIGURE 20 is a cross-sectioned end elevation view taken on line 20—20 of FIG. 19.

The press which actuates the movable die components is arranged so that the tool part 148 is first advanced into the work to the position shown in FIGS. 19 and 20, while the annular cylindrical sleeve 150 remains stationary. In the position of FIGS. 19 and 20 the exterior of the valve body is completely enclosed by die parts 110, 112 and 140. The interior of the body is completely filled by parts 120 and 148. Only the flange around the closure member opening remains unfinished. One advantage of the present method is that the body is thus substantially completely confined by die parts when the closure member opening flange is formed. As a result, in the forming of this flange, no reliance is placed on the rigidity of the pipe or tubing material to cause it to move to the final desired shape. Rather the portion of this material which is to form the flange has no alternative but to go into the proper final shape under the influence of the confining die parts.

Figure 21:
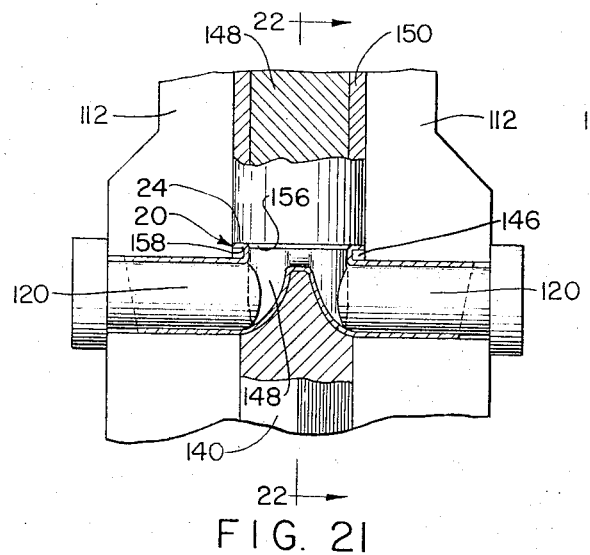
FIGURE 21 is a cross-sectioned side elevation view of the die parts of FIG. 19 with the flange forming ring shown forming the body opening flange.
Figure 22:
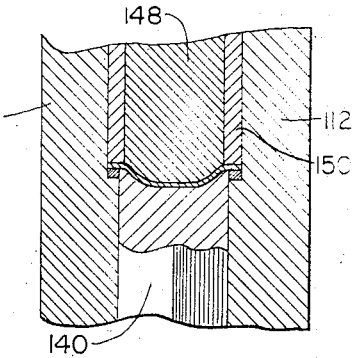
FIGURE 22 is a cross-sectioned end elevation view taken on line 22—22 of FIG. 21.

After die part 148 is in the position shown in FIGS. 19 and 20 the press is further actuated to move die part 150 into the position shown in FIGS. 21 and 22. The forming surface 156 of the die part 150 is shaped to provide the surface 24 of the flange 20. To assist in spreading the tubing material radially outward from the die part 148 the inner edge of this surface 156 is tapered at 158. This also provides a rounding on the inner edge of the flange surface 24 which is desirable because it prevents damage to the diaphragm in the valve.

Figure 23:
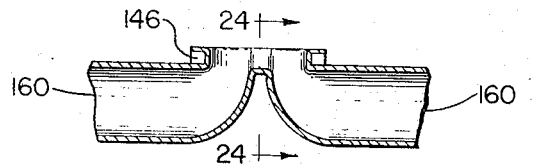
FIGURE 23 is a cross-sectioned side elevation view of the pipe section after it is removed from the dies of FIG. 21.
Figure 24:
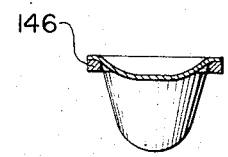
FIGURE 24 is a cross-sectioned end elevation view taken on line 24—24 of FIG. 23.
Figure 25:
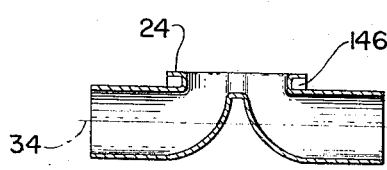
FIGURE 25 is a view like FIG. 23, but showing the ends of the body trimmed.
Figure 26:
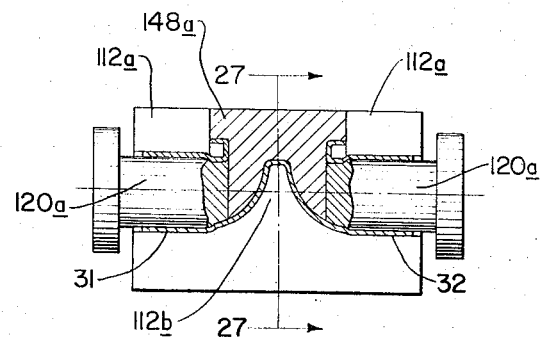
FIGURE 26 is a cross-sectioned side elevation view showing the body of FIG. 25 in another set of dies which prepares the ends of the valve in socket form.
Figure 27:
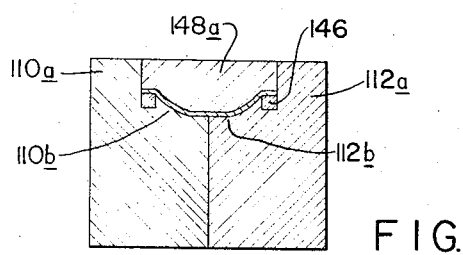
FIGURE 27 is a cross-sectioned end elevation view taken on line 27—27 of FIG. 26.
Figure 28:
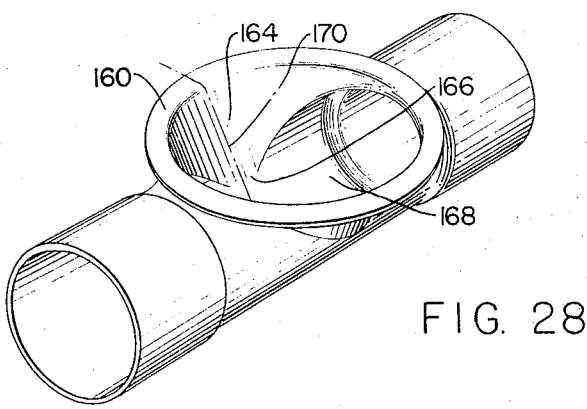
FIGURES 28 to 32 are views like FIGS. 1 to 4 and 6 but show a diaphragm valve body of the weir-less type.
Figure 29:
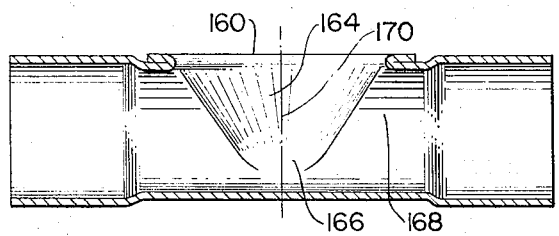
Figure 30:
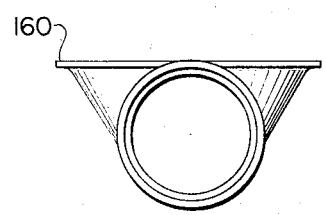
Figure 31:
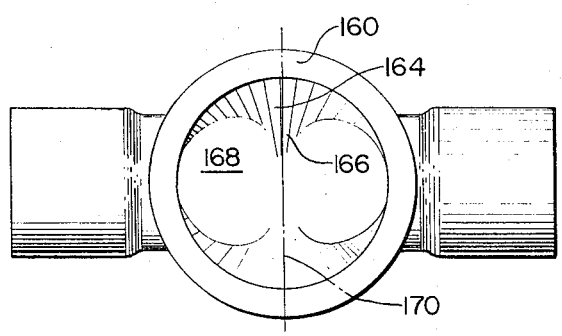

FIGS. 23 and 24 show the shape of the tubing section after removal from the dies. The ring 146 is still in place. The non-square ends 160 of the piece are the result of the generally greater movement of the material on the lower side of the section during formation of the weir. These ends may be squared-off by a cutting operation and will then have the appearance shown in FIG. 25. FIGS. 26 and 27 show how the socket end connections 31 and 32 can be formed in the body of FIG. 25 with additional dies of special shape. These dies include components 110a and 112a which are like components 110 and 112 in FIG. 10 except that together they include an integral weir engaging part 110b and 112b corresponding to part 140 in the position shown in FIG. 22. The die components 110a and 112a are shaped to form the socket end connections in cooperation with plungers 120a which are forced into place with press equipment (not shown). Another die component 148a is like a composite of components 148 and 150 in their positions shown in FIGS. 21 and 22. The die components 110a and 112a and 148a of FIGS. 26 and 27 completely hold the tubing section of FIG. 25 while the plungers 120a are forced into place to radially stretch the metal and form the socket ends.

FIGS. 28, 29, 30 and 31 show another type of diaphragm valve body which can be formed by a practicing of the present method invention. This body differs from that of FIGS. 1–6 in that it has no weir. However, the seating for the diaphragm is similar to that of the body of FIGS. 1–6 in that it extends from the flange surface 160 on one side of the closure member opening down the straight sloping sides 164 of the body to a region 166 where these sides blend tangentially with the cylindrical passageway walls 168. The dotted line 170 shows the normal seating line for the diaphragm 172 used in a valve of this type (see FIG. 32). The diaphragm is actuated by mechanism 174 housed in a bonnet 176 and operated by a handwheel 178.

Figure 33:
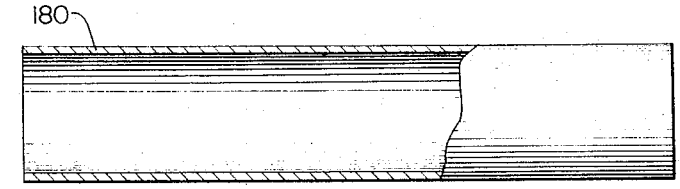
FIGURE 33 is a cross-sectioned side elevation view of a pipe or tubing section preparatory to its being formed into a weir-less valve body as shown in FIG. 28.
Figure 34:
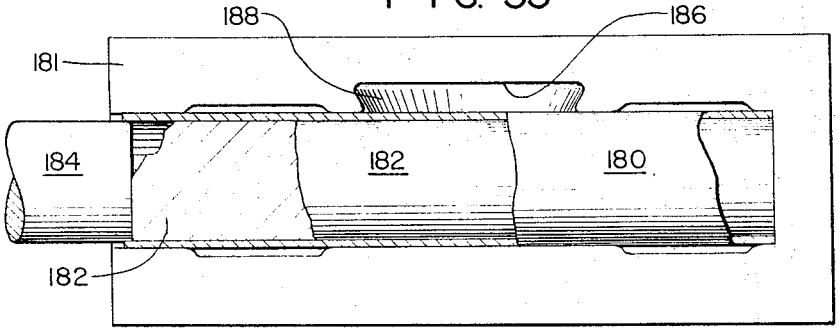
FIGURE 34 shows the pipe section of FIG. 33 in a die and filled with Wood's metal.
Figure 35:
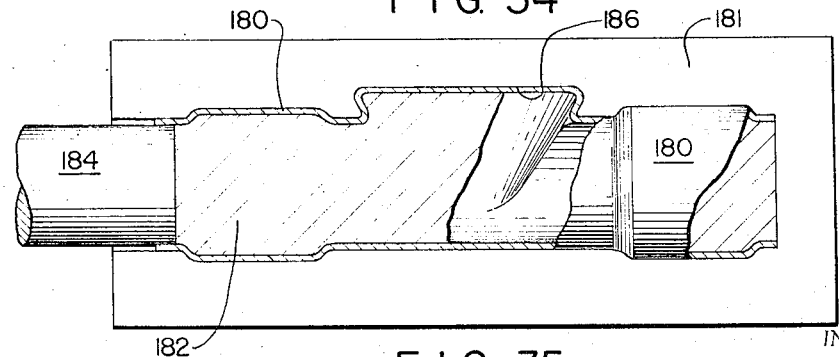
FIGURE 35 shows the shape of the pipe section after the fluid-like material has been subjected to great pressure.

Because none of the material of the initial piece of pipe or tubing needs to be moved inwardly in the formation of this body, this invention can involve initial steps which are quite different from those shown in FIGS. 8 to 27. Thus, FIGS. 33 and 34, respectively, show a section of tubing 180, the section located between a pair of dies 181 and filled with a fluid or fluid-like material 182 such as Wood's metal. Insertion of plunger 184 as shown in FIGS. 34 and 35 forces the material of the tubing section out against the walls 186 of the die cavity 188. These walls have generally the shape of the finished body.

Figure 32:
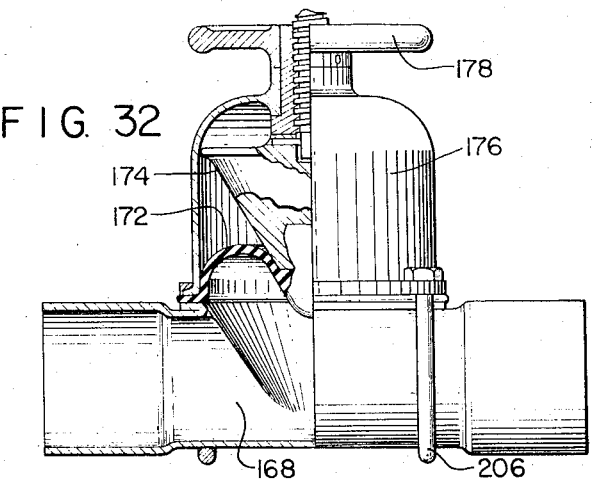
Figure 36:
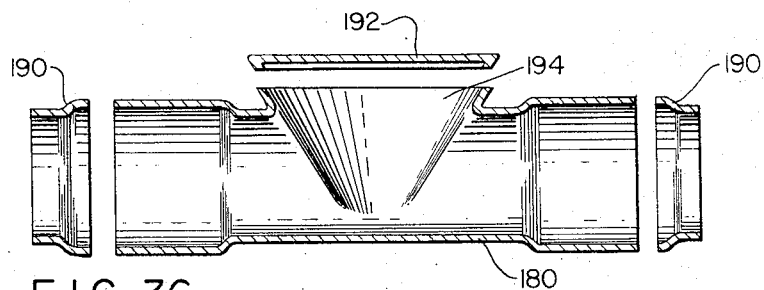
FIGURE 36 shows the pipe section as formed in FIG. 35 removed from the dies and machined.
Figure 37:
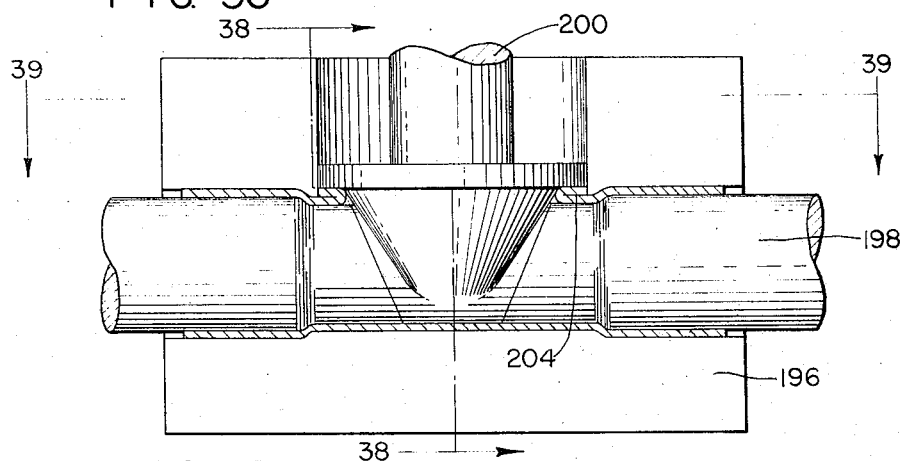
FIGURE 37 shows the pipe section of FIG. 36 inserted in a set of dies and with internal dies in place and with a seat and flange forming die piece moved into place.
Figure 38:
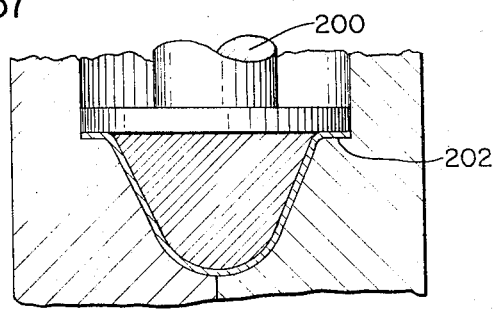
FIGURE 38 is a cross-sectioned end elevation view taken on line 38—38 of FIG. 37.
Figure 39:
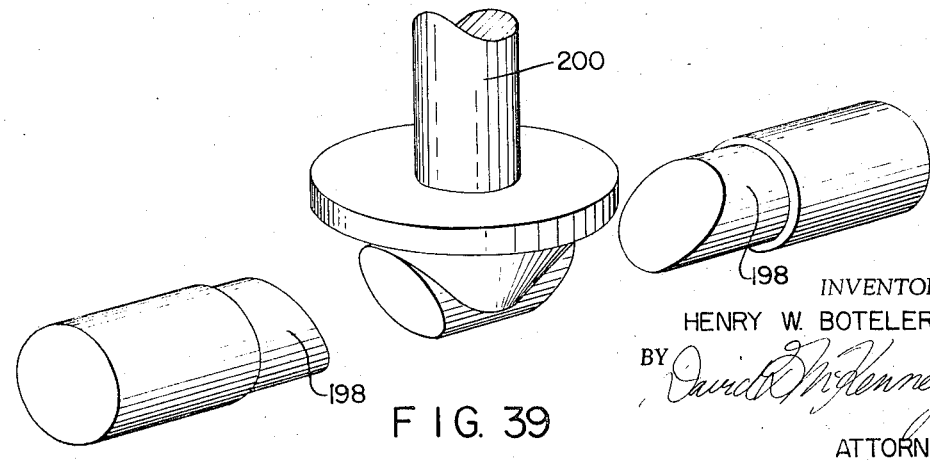
FIGURE 39 is a perspective view of the internal dies and of the seat and flange-forming die.

After the tubing section is thus shaped, it is removed from the dies and the fluid material 182 is in turn removed from it. Three machining cuts are then made as shown in FIG. 36, these involving the trimming off of the excessive ends 190 and the removal of a cap piece 192 from outwardly bulged central portion 194. This central portion is shaped to have the configuration of the finished valve body except that the sloping walls extend inwardly at the cap piece 192 rather than outwardly into a flange. Accordingly, after the cap piece 192 is cut away the tubing section is inserted in a set of dies like those shown in FIGS. 37, 38 and 39 and included external pieces 196, end plugs 198, and plunger 200 which engages the upper portions of the sloping walls 194 and bends them over to the shape shown in FIGS. 37, 38 and 39. No split ring is used in this embodiment, so that the underside of the flange 202 is in contact with the exterior surface of the end portions of the body as indicated at 204. This construction is possible because instead of the clamp used in the arrangement of FIGS. 1–6, the bonnet in FIGS. 32 is secured to the body by U-bolts 206.

Because the interior of the tubing section is completely filled with die components (see FIG. 37), the material of the piece of tubing is compelled to take shape dictated by the form of the cavity remaining when the end plugs 198 and 200 have been completely inserted.

What I claim is:

1. The method of forming an elongated valve body from a hollow metal cylinder having straight walls of substantially uniform thickness, having a passage therethrough with a central longitudinal axis and having a pair of openings at the ends of said passage, said method comprising the steps of:
   (I) cutting in said cylinder an opening which:
      (A) is smaller than said end openings,
      (B) is located on one side of said cylinder,
      (C) is located between said end openings,
      (D) has an axis substantially perpendicular to and intersecting said longitudinal axis,
   (II) advancing a first seat-forming die against the exterior surface of the cylinder on the side thereof opposite said side opening and continuing said advancement to begin the forming of a closure member seating portion while,
   (III) forming a first portion of said cylinder wall which borders on said side opening into a lip which:
      (A) extends away from said longitudinal axis,
      (B) surrounds said side opening, then,
   (IV) advancing a second seat-forming die:
      (A) through said side opening,
      (B) along said side opening axis,
      (C) into engagement with the interior surface of the cylinder on the side thereof opposite said side opening,
   (V) further advancing said second seat-forming die to force said seating portion of the cylinder between said first and second seat-forming dies to complete the forming of said closure member sealing portion in the body,
   (VI) supporting a second portion of said cylinder wall which is adjacent said lip against movement toward said longitudinal axis while said second seat-forming die is further advanced.
   (VII) bending said lip:
      (A) outwardly with respect to said side opening axis,
      (B) inwardly with respect to said cylinder axis,
      (C) into a plane which:
         (1) is parallel to said longitudinal axis,
         (2) is perpendicular to said opening axis, while said second seat-forming die is further advanced and while said second cylinder wall portion is supported, to form a flange around said opening.

2. The method of forming a valve body with rigid dies from an elongated hollow metal cylinder having straight walls of substantially uniform thickness, having a passage therethrough with a central longitudinal axis and having a pair of openings at the ends of said passage, said method comprising the steps of:
   (I) cutting in a cylinder an opening which:
      (A) is smaller than said end openings,
      (B) is located on one side of said cylinder,
      (C) is located between said end openings,
      (D) has an axis substantially perpendicular to and intersecting said longitudinal axis,
   (II) advancing a first valve-seat forming die against the exterior surface of the cylinder on the side thereof opposite said side opening and continuing said advancement to begin the forming of a valve seat portion while,
   (III) forming a first portion of said cylinder wall which borders on said side opening into a lip which:
      (A) extends away from said longitudinal axis,
      (B) surrounds said side opening,
   (IV) supporting a second portion of said cylinder wall which is adjacent said lip against movement toward said longitudinal axis,
   (V) advancing a second valve-seat forming die:
      (A) through said side opening,
      (B) along said side opening axis,
      (C) into engagement with the interior surface of the cylinder on the side thereof opposite said side opening.
   (VI) simultaneously advancing a third opening flange forming die:
      (A) against said lip,
      (B) parallel to said side opening axis,
   (VII) further advancing each of said dies to simultaneously:
      (A) squeeze said valve seat portion between said first and second seat-forming dies to complete the forming of a valve seat,
      (B) bend said lip:
         (1) away from said side opening axis,
         (2) toward said longitudinal axis, to form a flange around said side opening.

3. The method of forming a valve body with rigid dies from an elongated hollow metal cylinder having straight walls of substantially uniform thickness, having a passage therethrough with a central longitudinal axis and having a pair of openings at the ends of said passage, said method comprising the steps of:
   (I) cutting in said cylinder an opening which:
      (A) is smaller than said end openings,
      (B) is located on one side of said cylinder,
      (C) is located between said end openings,
      (D) has an axis substantially perpendicular to and intersecting said cylinder axis,
   (II) advancing a first weir forming die:
      (A) along said opening axis,
      (B) into engagement with the exterior surface of the cylinder on the side thereof opposite said side opening,
   (III) further advancing said first weir forming die:
      (A) to bend said opposite cylinder side inwardly toward said cylinder axis, (B) to form a weir across said passage at said side opening, (IV) forming a first portion of said cylinder wall which borders on said side opening into a lip which:
   (A) extends away from said longitudinal axis,
   (B) surrounds said side opening, (V) advancing a second valve-seat forming die:
   (A) through said side opening,
   (B) along said side opening axis,
   (C) into engagement with the interior surface of the weir, (VI) further advancing said second valve-seat forming die to finally form the interior surface of the weir, (VII) supporting a second portion of said cylinder wall which is adjacent said lip against movement toward said longitudinal axis while said second valve-seat forming die is further advanced, (VIII) bending said lip:
   (A) away from said side opening axis,
   (B) toward said longitudinal axis, while said second valve-seat forming die is further advanced and while said second cylinder wall portion is supported, to form a flange around said opening.

References Cited by the Examiner

UNITED STATES PATENTS

| | | |
|---|---|---|
| 869,340 | 10/1907 | Walworth. |
| 1,811,501 | 6/1931 | Holmes _____ 29—157 X |
| 1,911,653 | 5/1933 | Taylor _____ 29—157 |
| 2,149,508 | 3/1939 | Coe _____ 113—44 |
| 2,238,037 | 4/1941 | Cornell _____ 29—157 X |
| 2,360,359 | 10/1944 | Meyers _____ 29—482 X |
| 2,616,164 | 11/1952 | Tiedemann _____ 29—157.1 |
| 2,766,513 | 10/1956 | Huet _____ 29—157 |
| 2,925,849 | 2/1960 | Hinz et al. _____ 153—48 |
| 3,067,764 | 12/1962 | Geary _____ 251—331 X |
| 3,093,864 | 6/1963 | Waldron et al. |

FOREIGN PATENTS

| | | |
|---|---|---|
| 88,156 | 8/1896 | Germany. |
| 963,325 | 5/1957 | Germany. |

JOHN F. CAMPBELL, *Primary Examiner.*

WHITMORE A. WILTZ, *Examiner.*

J. D. HOBART, *Assistant Examiner.*